United States Patent Office 3,433,098
Patented Mar. 18, 1969

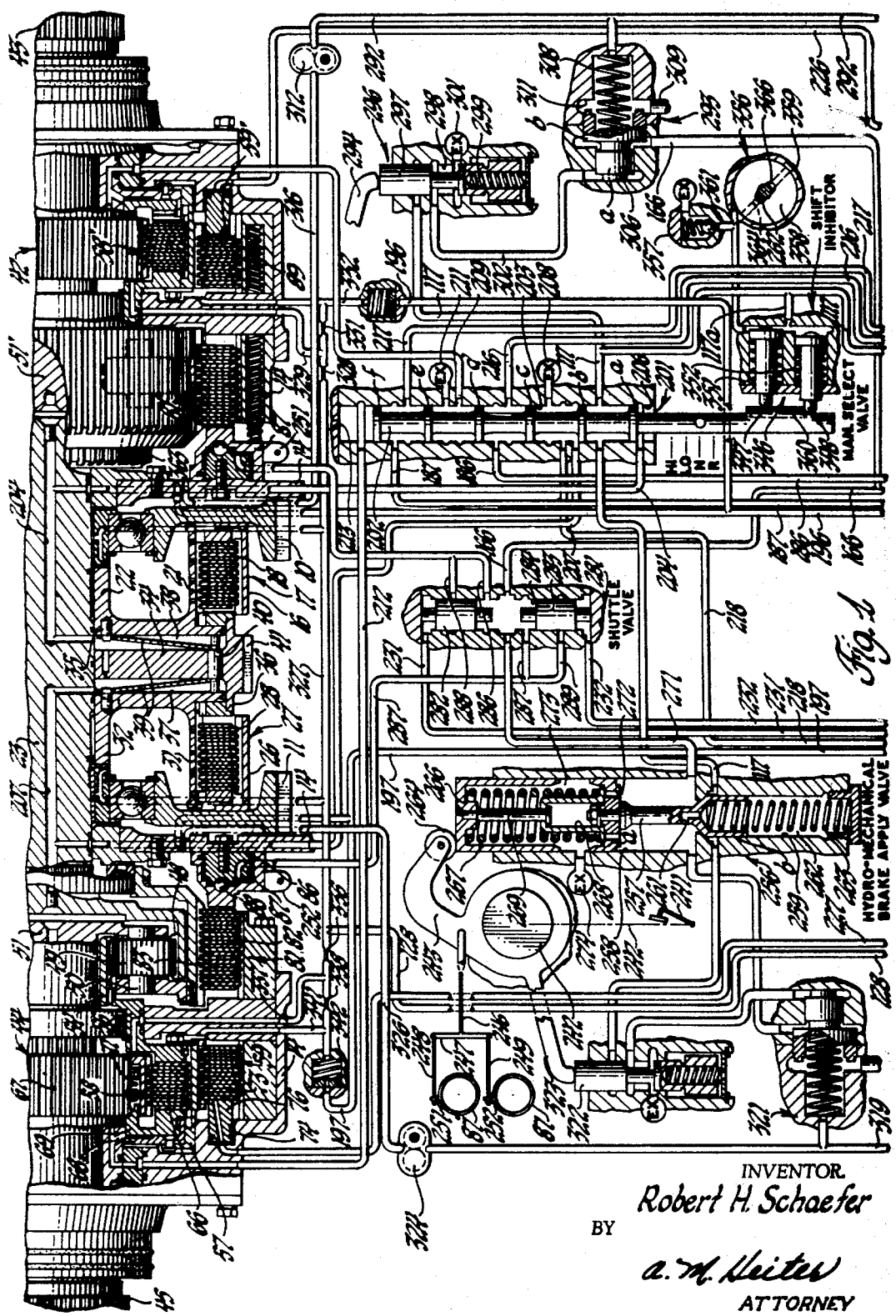

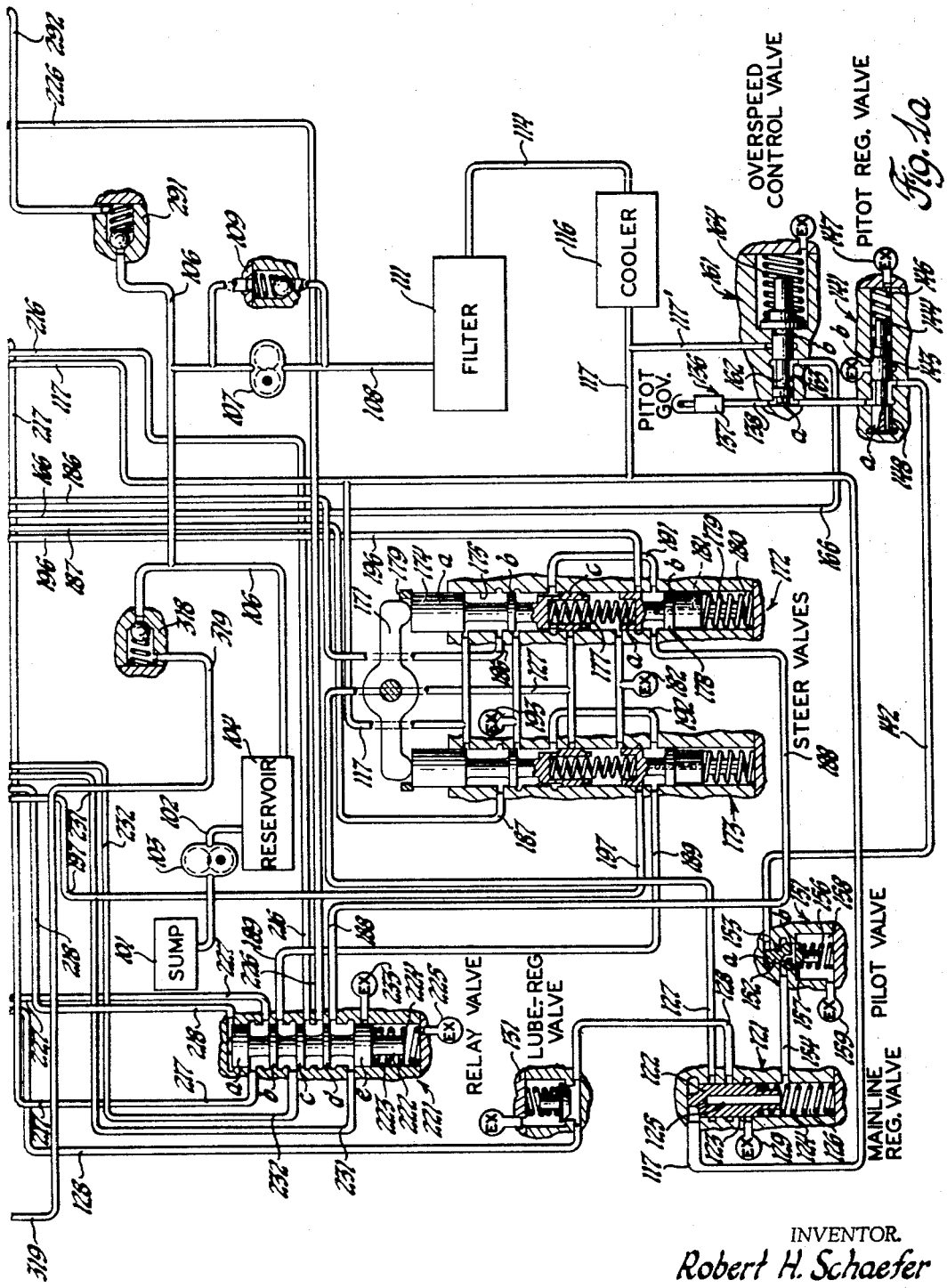

3,433,098
TRANSMISSION HAVING SPEED RESPONSIVE MANUAL SELECTOR VALVE BLOCKERS FOR FORWARD AND REVERSE SPEEDS
Robert H. Schaefer, Westfield, Ind., assignor to General Motors Corporation, Detroit, Mich., a corporation of Delaware
Original application Mar. 10, 1965, Ser. No. 438,634, now Patent No. 3,378,119, dated Apr. 16, 1968. Divided and this application Sept. 20, 1967, Ser. No. 678,472
U.S. Cl. 74—752                          2 Claims
Int. Cl. F16h 3/74

ABSTRACT OF THE DISCLOSURE

A transmission having a manual selector valve for selection of forward and reverse drives, is herein disclosed, in which the selector valve is prevented from shifting from forward to reverse and vice-versa when the vehicle speed is above a predetermined value. The shift inhibitor mechanism includes an output driven governor which supplies a pressure signal, proportional to vehicle speed, to a pair of plungers which, upon sufficient pressure signal, engage the selector valve to prevent forward-reverse shifting.

---

This application is a division of application Ser. No. 438,634, filed Mar. 10, 1965, now Patent No. 3,378,119, granted Apr. 16, 1968.

The invention relates to transmissions and more particularly to transmission controls.

When engines having low engine braking capacity, such as turbine engines, are employed with transmissions, it is desirable to prevent vehicle overrun which would motor the engine at excessive or dangerous speeds. This may be limited, particularly in cross drive transmissions, by automatically applying the vehicle brakes in response to an overspeed signal. In cross drive transmissions where the vehicle brakes are employed for clutch brake steering and for normal vehicle braking, it is necessary to provide controls which will selectively operate the brakes for steering and jointly operate the brakes for normal vehicle braking and overspeed braking.

The control system supplies a source of fluid under pressure regulated by a pilot type main line regulator valve wherein the regulated pressure urges the regulator valve in one diection and the opposing biasing force is supplied substantially entirely by a regulated pilot pressure regulated by a pilot valve. The regulation of the main line pressure may be varied by additional control functions, such as vehicle speed. These control functions are applied to the pilot pressure regulator valve to regulate the pilot pressure employed as the biasing pressure on the main light regulator valve.

In the hydraulic control system, a manual valve is employed to selectively establish ratio ranges, such as reverse, neutral, low and high, and a steer valve is employed in each range to establish clutch brake steering in reverse and low and geared steering in high. An inhibitor mechanism is also employed in which a governor pressure biases mechanical stops into the path of the manual control valves to prevent shifting between forward and reverse above a safe speed while permitting shifting between forward ratios.

An object of the invention is to provide in a drive mechanism an automatic control system for prohibiting overspeed of the engine.

Another object of the invention is to provide in a cross drive transmission having controls for providing clutch brake steering, an automatic overspeed control to apply steering brakes to limit the speed of the engine driving the transmission.

Another object of the invention is to provide in a cross-drive transmission a control system for applying vehicle brakes manually and automatically in response to overspeed conditions.

Another object of the invention is to provide in a transmission control system a source of fluid under pressure regulated by a pilot regulator valve in which the pilot pressure is regulated in accordance with a condition of transmission operation.

Another object of the invention is to provide in a cross drive transmission control system having a manual valve, a steer valve and a brake valve operative selectively to apply the vehicle brakes selectively for steering and simultaneously for vehicle braking and automatic means for applying the brakes in response to engine overspeed.

These and other objects of the invention will be more apparent from the following description and drawing of a preferred embodiment thereof.

The transmission and control system is schematically shown in the drawing with FIGURE 1 above FIGURE 1a.

The invention is illustrated in an arrangement for controlling a cross drive transmission providing two drive ratios in both forward and reverse like the transmission shown in FIGURE 2 of U.S. application S.N. 240,559 now Pat. No. 3,253,688, Livezey. A conventional engine with low engine braking, such as a turbine, through reduction and/or multiratio transmission, drives a driven forward spur gear driving the input spur gear 10 of the cross drive transmission forwardly and a reverse spur gear and idler gear driving the reverse input gear 11 reversely. The input gears 10 and 11 are rotatably mounted by suitable bearings on the cross drive transmission housing 14. The forward input gear 10 drives the input drum 16 of forward clutch 17, which has a plurality of plates 18 alternately splined to the input drum 16 and the output drum 21, which has a hub portion 22 splined to the cross shaft 23. The reverse input gear 11 similarly drives the input drum 26 of the reverse clutch 27 which has a plurality of plates 28 with alternate plates splined to the input drum 26 and the output drum 31, which has a hub 32 splined to the cross shaft 23. Both output drums 21 and 31 are perforated to provide cooling fluid passages to the clutch plates. An annular piston 34 is sealed at the center to shaft 23 and has an annular cylindrical portion 36 extending on both sides and engaging in sealing relationship on one side the outer perimeter of hub 32 to provide an expansible chamber 37 for moving piston 34 to engage forward clutch 17 and on the other side the outer perimeter of hub 22 to provide an expansible chamber 38 for moving the piston to engage the reverse clutch 27. The annular retraction springs 39 located on opposite sides of the piston 34 are retraction or centering springs to return the piston to the neutral position where both clutches are disengaged. These retraction springs have slots or apertures to engage pins 35 at their inner perimeter on the hubs 22 and 32 and at the outer perimeter pins 40 in piston 34 to provide a drive from cross drive shaft 23 to gear 41 on the external perimeter of the cylindrical portion 36 to provide an auxiliary drive whenever the transmission is being operated in either forward or reverse for accessories, such as the pump supplying fluid to the control and lubrication system. The pins 40 have a heavy central portion as long as the width of the piston and extensions engaging the hubs to axially fix the pins 40 and thus stop the springs at the center position shown.

The cross drive shaft 23 is connected through a right gear unit 42 to drive the right output hub 43 and a left gear unit 44 to drive the left output hub 45. Since both gear units are the same the following description and reference numerals are applied to both gear units. The cross drive shaft 23 drives the ring gear 48 which meshes with the planetary pinions 49 mounted on a carrier 50 connected to drive the output shaft 51. The sun gear 54, which meshes with planetary pinions 49, is connected by a hub 56 to the drum 57 between the high clutch 58 and the low brake 59. The high clutch 58 has plates 66 alternately splined to drum 57 and hub 67 splined to the output shaft 51 and is actuated by a high motor having a cylinder 68 in which the piston 69 is reciprocally mounted. Suitable retraction springs 71 return the piston to the disengaged position. The low brake 59 has suitable plates 73 alternately splined to the drum 57 and the fixed housing 14. The low motor has a suitable cylinder 74 formed in the fixed housing 14 and a piston 76 reciprocally mounted therein. The piston is retracted by a suitable retraction spring not shown. The output brake 81 has plates 82 alternately splined to the output drum 83 and the fixed housing 14. The output brake is engaged by a motor having a fixed piston 86 attached to the housing 14 with an annular cylinder 7 mounted for reciprocation and rotation thereon. Rotary movement of the cylinder actuates the ball cam 88 mounted in cam grooves on the piston and/or cylinder to axially move the cylinder to apply the brakes. Retraction spring 89 disengages this brake.

The output shaft 51 of the left gear unit 44 drives the left output hub 45, and the right output shaft 51' of the right gear unit 42 drives the right output hub 43. Engagement of the right and left high clutches 58' and 58, when fluid is supplied to the operating motors, connects the sun gear 54 for rotation with the shaft 51' and 51 to lock up both bear units for direct drive. Engagement of the right and left low brakes 59' and 59 in the gear units holds the sun gears stationary to provide a reduction drive to the right and left output shafts 51' and 51. Engagement of the right and left brakes 81' and 81 will brake rotation of the right and left shafts 51' and 51 and either or both the right and left output hubs 43 and 45.

HYDRAULIC CONTROLS

Source

The fluid exhausted from the control system and the lubrication system returns to the transmission sump 101 and is scavenged through the line 102 by a scavenger pump 103 to return fluid to the reservoir 104. Pump 103 is driven from the cross shaft 23 which is driven in both forward and reverse drives through a gear suitably meshing with gear 41. Fluid is supplied to the control system 50 from the reservoir 104 by the suction line 106 and the input driven or engine driven pump 107 to the pump outlet line 108. A bypass relief valve 109 limits the pressure delivered by pump 107 to pump outlet line 108 to a safe value. The line 108 is connected through the filter 111 to the cooler line 114 which delivers oil through the cooler 116 to the main line 117.

Main line regulator valve

The main line 117 is connected to the main line pressure regulator valve which is a pilot type regulator valve 121 to regulate the pressure in the main line and steer feed line 127 at a value proportional to a transmission condition, such as speed, and to deliver the excess to the lubrication line 128. The main line regulator valve 121 has a valve element 122 located in a bore 123 and is biased to the closed position shown by a spring 123 and pilot regulated pressure bled by restricted passage 125 to spring chamber 126 and regulated by pilot valve 151. Pressure in main line 117 will bias the valve element 122 to sequentially deliver fluid under pressure to the steer feed line 127, the lubrication line 128 and the excess to exhaust 129. The pump 107 normally supplies fluid to the main line 117 in sufficient volume so that the steer feed line 127 is supplied with fluid at main line pressure. Since the pressure in the lubrication line 128 is regulated at a much lower pressure by the lubrication line regulator valve 131, the main line pressure regulator valve will normally regulate by exhausting pressure to the lubrication line. However, under certain conditions, such as cold oil in the lubrication line providing a higher resistance to flow, the valve element 122 will open the direct exhaust 129 to prevent excessive pressure. The main biasing force is provided by fluid pressure in chamber 126 which is regulated by pilot valve 151 at a pressure proportional to input speed as described below. The spring has a very low biasing force value and is merely used to hold the valve element 122 in the upper or closed position at rest. Thus a rateless regulator valve modulated by another condition, such as speed, is provided.

Pitot governor

A pitot governor 136 having a can 137 supplied with fluid from lubrication line 128 or another suitable source is fixed to the forward or reverse input gears 10 or 11 and thus provides a governor pressure in governor line 138 proportional to input speed to the transmission.

Pitot regulator valve

The pitot pressure regulator valve 141 limits the pitot governor pressure in the regulated governor pressure line 142 to a part speed value so the main line pressure is not reduced below a minimum operating value, i.e., 100 p.s.i. required for output brake operation at high speeds. Regulator valve 141 does not affect the pressure upstream of valve 141 and unregulated governor pressure line 138. The governor pressure regulator valve 141 has a valve element 143 having lands $a$ and $b$ located in a bore 144. A spring 146 located in the end of the bore exhausted by exhaust 147 biases valve 143 to the open position shown in which governor line 138 communicates freely with regulated governor line 142. The line 142 communicates through passage 148 in land $a$ to the end of bore 144 to bias the valve element 143 against the biasing force of spring 146 toward the closed position to limit the pressure in regulated governor pressure line 142 to a maximum value.

Pilot valve

The pilot valve 151 regulates the biasing pressure acting in chamber 126 of the main pressure regulator valve 121. The pilot valve 151 has a valve element 152 having a small land $a$ and a large land $b$ located in a stepped bore 153. The regulated governor pressure in line 142 is connected to the closed small end of bore 153 to act on the land $a$ of valve 152. The chamber 126 of the main pressure regulator valve is exhausted by exhaust line 154 which is connected to the pilot valve 151 at the point between the large and small bore portions of bore 153 to act on the unbalanced area of valve element 152 or on the additional area of land $b$. Spring 156 biases valve element 152 to the closed position shown in which line 154 is connected to the passage 157 in valve element 152 which is blocked at the lower end by the larger portion of bore 153. When exhaust pressure from line 154 and/or governor pressure from line 142 acting respectively on lands $b$ and $a$ overcome the bias of spring 156 the valve element is moved to the open position, opening the passage 157 to the spring chamber 158 exhausted by exhaust 159.

Overspeed valve

The overspeed control valve 161 has a valve element 162 having lands $a$ and $b$ located in a bore 163. The valve is biased to the closed position shown blocking main line branch 117' by the spring 164. At excessive coast speeds, the governor pressure in line 138 acts on land $a$ to overcome the spring bias to move the valve to the open position connecting main line branch 117' to the overspeed brake line 166.

Steering valves

The manual steering control actuates arm 171 to selectively actuate the steering valves to provide right or left steering pressure. The right steering valve 172 and the left steering valve 173 are identical, therefore, the following description and reference numerals are applied to both valves. The drive pressure control valve element 174 having lands a, b and c is located in a bore 175 and acts through spring 177 to bias the regulator valve 178 against the spring 179 in chamber 180 in the closed lower end of bore 175. Regulator valve element 178 has lands a and b and a passage connecting the space between the lands to the bore below this valve element. This passage may have a check valve for damping flow to the space below the valve element.

In the straight ahead position the springs position the valves as shown with the drive valve element 174 engaging stop 179. The main line 117 is connected between lands a and b of the right and left valve element 174, respectively, to the right drive feed line 186 and the left drive feed line 187. The right steer line 188 and the left steer line 189 are connetced by the respective right and left steering valves between the lands a and b of valve element 178 to the respective continuations or branches of the right and left steer lines 191 and 192 which connect to the bore 175 at an upper point between the lands b and c with the valve at its normal position to connect both right and left steer feed lines 188 and 189 to the exhaust passage 193. The right and left lube lines 196 and 197 are blocked by the lands a of regulator valve elements 178 of the right and left steer valves 172 and 173. The space between the valve elements 174 and 178 is exhausted by exhaust 182.

For right steering the lever 171 is rotated clockwise moving the elements of right steer valve 172 down. When this occurs, the right steering valve 174 blocks main line 117 from the right drive line 186 and connects this latter line to exhaust 193. This movement, when land b moves below exhaust line 193, blocks the exhaust of right steer line branch 191 to exhaust 193 and then connects main line pressure via the steer feed line 127 via line 191 to the right steer feed line 188. The pressure supplied to right steer line 188 also flows via passage 181 to spring chamber 180 to bias the valve element 178 upwardly and through spring 177 so that the pressure in the steer feed line is regulated at a value proportional to the degree of movement from the neutral position of the manual control and the pressure on the manual control. As soon as sufficient flow of fluid is provided to raise the pressure to the desired regulated pressure, the lower valve element 178 raises slightly and excess fluid is connected to the right lube line 196. When the right steer feed valve 172 is moved downwardly, the left steer feed valve 173 remains in the same position against stop 179.

Manual valve

The manual valve 201 controls the ratio in which the cross drive transmission is operating and has a valve element 202 having lands a through f located in a bore 203. In the neutral position N shown, the main line 117 is blocked between the lands a and b. The reverse line 204 is connected to exhaust 206. The forward line 207 is connected to exhaust 208. The right high line 209 is connected to exhaust 211 and the left high line 212 is connected to exhaust 213. In the low position LO, the manual valve connects main line 117 to the forward line 207 to chamber 37 to engage the forward clutch 17. The reverse and high lines remain connected to exhaust as in neutral. The right drive line 186 is connetced to the right low feed line 216 and the left drive line 187 is connected to the left low feed line 217. The low feed lines are connected to the relay valve. In high position HI, the main line 117 is connected to the forward line 207 and the relay signal line 218. The right drive feed line 186 is connected to the right high line 209 and the left drive feed line 187 is connected to the left high line 212. The right low feed line 216 is connected to exhaust 208 and the left low feed line 217 is connected to exhaust 211.

In reverse position R, the main line 117 is connected by reverse line 204 to chamber 38 to engage the reverse clutch 27. The left drive feed line 187 and the right drive feed line 186 are blocked. The forward line 207 and the signal line 218 are connected to exhaust 208.

Relay valve

The relay valve 221 acts in conjunction with the manual valve to control ratio change and steering controls. Valve 221 has a valve element 222 having the lands a, b, c, d and e located in a bore 223 and biased to the normal or neutral low and reverse position by the spring 224. The spring end of bore 223 is vented by exhaust 225. In the normal position shown, the right low feed line 216 supplies fluid, when supplied by the manual valve from the right drive line 186, to the right low line 226. The left low feed line 217 similarly supplies fluid, when supplied by the manual valve from the left drive feed line 187, to the left low line 227. When fluid is supplied by the right and left steer lines 188 and 189, it is connected respectively to the right and left brake signal lines 231 and 232 to control the shuttle valve 281. When the manual valve is in high, fluid in signal line 218 is supplied to the closed end of bore 223 and acts on land a to move the relay valve 221 to the high position. In the high position, the left low feed line 217 is blocked. The left steer line 189 is connected to the left low line 227. The right low feed line 216 is connected to the left brake signal line 232, a right steer line 188 is connected to the right low line 226 and the right shuttle valve line 231 is connected to exhaust 233.

Brake control

A brake pedal 241 acts through a shaft 242 to rotate the brake lever 243 in a clockwise direction to apply the brakes. The brakes are mechanically applied by a linkage system employing a rod 246 actuated by the lever 243. The rod 246 acts through a suitable differential mechanism, such as the whiffletree lever 247 which is centrally pivoted to the rod 246 and pivoted at the opposite end to the right brake rod 248 and the left brake rod 249 which are respectively connected to the right abutment 251 on the right brake cam 87' and the left abutment 252 on the left brake cam 87. When the cam is rotated, it acts through the balls 88 to mechanically apply the brake in a well known manner by rotating the cam in the direction of forward wheel movement so that the mechanically applied movement urges the cam into engagement with the rotating brake plate which provides further brake apply force to provide a self-energizing brake.

The brake valve 256 has a valve element 257 having a large land a located in the large bore 258 and a small land b located in the small bore 259. Pressure from line 117 is connected to the bore 259 and normally blocked by the land b. The lever 243 has a roller 264 at its end engaging and operative to depress the actuator piston 266 which acts through spring 267 to provide a biasing force on the valve element 257. The spring 267 is maintained in a compressed position by the spring retainer cup 268 which is secured to the upper end of actuator piston 266 by the rod 269 in a manner to permit further compression of the spring and movement of the retainer cup 268 toward the head of the actuator piston 266. When the brake lever is moved in a clockwise direction for brake apply movement, actuator piston 266 is depressed so the force of spring 267 is applied to the valve member 257 to depress the valve element to admit fluid from line 117 to space between the valve lands which is always connected to the brake feed line 271. The brake feed line pressure is connected by passage 261 to the spring chamber 262 below land a and acts with the spring 263 to bias the valve upwardly to the closed position closing main line 117. The pressure in line 271 is regulated in accordance with the brake pedal position and provides a reaction force on the brake pedal less than but proportional to brake apply pressure so that the operator may feel the extent of brake application through the hydraulic system. During brake pressure regulation there is sufficient leakage so an exhaust is not needed at the valve.

When the brake lever 243 is in the brake off position the roller 264 has lifted so that there is a small clearance between the cup 268 and land $a$ of valve element 257 so that the brake pressure in the brake feed line during brake off condition, created by the brake reaction springs, will act through orifice 272 to separate land $a$ and cup 268 to provide a brake-off passage through orifice 272 to chamber 273 and exhaust 274. The orifice 272 or orifices have less flow capacity than overspeed brake line 166 so when brake valve 256 is in the off position fluid supplied by overspeed brake line 166 will provide pressure to apply the brakes.

Shuttle valve

A shuttle valve 281 has a right valve element 282 and a left valve element 283 located in a bore 284 which is closed at both ends. The right brake signal line 231 is connected to the end of bore 284 adjacent valve element 282 and the left brake signal line 232 is connected to the end of the bore 284 adjacent valve element 283. The brake feed line 271 and the overspeed brake line 166 are connected to the center of bore 284. With the valve elements in the end positions, as shown, the brake feed line or overspeed brake line are connected to the right brake line 286 and the left brake line 287. When fluid pressure is applied to the right brake signal line 231, this moves the right valve element 282 to the central position connecting the line 231 via right brake line branch 288 to the right brake feed line 286, the left brake remaining connected as above. When the left brake signal line 232 is supplied with fluid, valve element 283 is moved up to engage the valve element 282 connecting line 232 to left brake line branch 289 and left brake line 287. The brake feed line and overspeed brake line remain connected to the right brake line 286.

Brake cooling and lubrication

The suction line 106 is connected through a check valve 291 to the right lubrication suction line 292 which has an air valve 293 connected thereto which is closed to provide brake lubrication when the brake is applied. The brake lever 243 has a portion 294 which, in the brake disengaged position, holds the control valve 296 closed to block main line 117. When the brake is engaged through the pedal and lever 243, lever 294 is raised permitting spring 299 to raise valve element 297 in bore 298 to close exhaust 301 and connect main line 117 to control line 302.

The air valve 293 has a valve element 306 having a small land $a$ and a large land $b$ in a stepped bore. The spring 308 biases valve element 306 to the open position connecting air intake line 309 between the valve face on land $b$ and annular seat 311 to suction line 292. When fluid is supplied to control line 302 to act on land $a$ or to overspeed brake line 166 to act on land $b$, the valve element 306 moves against the bias of the spring to seat land $b$ on seat 311 to close air intake line 309 enabling pump 312 to pump cooling fluid from the reservoir to right cooling line 316 to cool the right brake 81'.

To supply cooling fluid to the left brake 81, suction line 106 is similarly connected through left check valve 318 to the left lubrication suction line 319 which has left air valve 321. A left control valve 322 is actuated by a left lever portion 323 to control the left air valve 321. Since these valves are the same and function in the same manner as the right control valve 296 and right air valve 293, the description is not repeated. When the left brake is manually or automatically applied, the left air valve 321 is closed so left lube pump 324 supplies cooling fluid to left cooling line 326 for left brake 81.

The continuously supplied lubrication line 128 is connected by branch 327 to cool the forward and reverse clutches. The branch 327 is connected through restriction 328 to right high lube branch 329 to cool the right high clutch 57' and through restriction 331 to low lube branch 332 to cool the right low brake 59'. The right steer lube line 196 is connected through the fast feed and slow return check valve to the low lube branch.

The branch 327 is connected via restriction 336 to left high lube branch 337 for left high clutch 58 and the latter is connected through restriction 338 to left low lube branch 341 which may also be supplied from the left steer lube line 197 by fast feed and slow return check valve 342.

Shift inhibitor

The shift inhibitor 346 prevents manual shifts between any forward speed and reverse at excessive speeds, i.e., 2 m.p.h. The inhibitor consists of a forward spring biased plunger 347 and a reverse spring biased plunger 348 located in bores 351 and 352. The springs bias the plungers to the free position and an output governor pressure biases the plungers at a predetermined speed, excessive for forward to reverse shifts, to the stop position. A restricted branch line 117a connects main line pressure to the bores. The exhaust is controlled by an exhaust controlling paddle wheel type governor 356 and limited to a pressure just above the pressure at which the plungers are moved to the stop position by the relief valve 357. The governor 356 has a wheel 358 enclosed in a housing 359 with the sides of the wheel and the housing in sealing relation. The housing has a tangentially connected governor line 361. The wheel connected by shaft 262, and a gear (not shown) meshing with gear 363 on the output shaft 51'. The wheel has radial passages 364 developing a centrifugal pressure head proportional to speed in governor line 361. The passages 364 are connected by axially extending exhaust passages 366 in the wheel and housing to continuously exhaust fluid from the main line.

The plungers cooperate with an abutment member 360 fixed on an extension of valve element 202. The abutment may also be fixed on or be a lever of the linkage employed to actuate the valve element. At excessive speeds in neutral or any forward drive, the plunger 348 would be moved into the path of the abutment and prevent a shift to reverse. Similarly, when in reverse, plunger 347 would prevent a shift to neutral and any forward drive.

Operation

When the engine is running, driving the input gearing, the pump 107 supplies fluid at a pressure decreasing with increasing input speed regulated by the main line regulator valve 121. The pitot governor 136 provides an input governor pressure which is limited at a predetermined intermediate value by the pitot regulator valve 141. This limited governor pressure in line 142 is employed to control the pilot valve 151 which regulates the pilot pressure for the pilot regulator valve 121 to a pressure which decreases with increasing transmission input speed up to a predetermined value, then remains constant. Thus the main line pressure in line 117 decreases with increasing speed to a predetermined value, i.e., 100 p.s.i., and remains constant at higher speeds so that there is always sufficient pressure to operate the fluid actuated ratio establishing devices and the vehicle brakes.

In neutral position N of the manual valve 201, main line pressure is not connected to any ratio establishing devices, thus there is a positive neutral. However, the steer lines 188 and 189 remain connected by relay valve 221, brake signal lines 231, 232 and shuttle valve 281 to the brakes, as in low. The overspeed brake control via overspeed brake line 166 and the manual brake control via brake feed line 271 and shuttle valve 281 remain operative.

When the manual valve is moved to the low position LO, main line 117 is connected by the forward line 207 to the chamber 37 to actuate piston 34 to engage forward clutch 17 to establish a forward input to the cross drive shaft 23 and both the right and left gear units. With the steering valves 172, 173 in the straight forward position shown, main line pressure is also connected to the right and left drive feed lines 186 and 187 which are connected by the manual valve 201 respectively to the right and left low feed lines 216 and 217. These low feed lines are connected by the relay valve 221 respectively to the right and left low lines 226 and 227 to engage the right low brake 59' and left low brake 59 to establish low ratio in both gear units.

For right steering in low ratio the steer control is moved to actuate lever 171 depressing the right steering valve 172 which will exhaust the right drive feed line 186 to disengage the right low brake 59' and connect steer feed pressure line 127 to the right steer line 188. The right steer line 188 is connected by relay valve 221 to the right brake signal line 231 which actuates the shuttle valve 281 by moving valve element 282 toward the center to provide a connection from line 231 to right brake line 286 to engage the right vehicle brake 81' to retard the right output shaft 51' and hub 43 to provide a right turn. For a left turn, the steering valve 173 is depressed to similarly disengage the left low brake 59 and engage the left vehicle brake 81. During right and left steering, the steer valve supplies lubricating fluid respectively to the right and left lubrication lines 196 and 197 to lubricate respectively the right and left vehicle brakes.

When the manual valve 201 is in the high position HI, the main line 117 remains connected to forward line 207 to drive the cross shaft 23 in a forward direction as in low. The main line is also connected to the signal line 218 which moves the relay valve 221 from the normal position shown down to the high position. The manual valve also connects the right and left drive feed lines 186 and 187 respectively to the right and left high lines 209 and 212 to engage the right high clutch 58' and left high clutch 58.

For right turning in high, the right steering valve 172 is moved downwardly. Then the right drive feed line 186 is connected to exhaust disengaging the right high clutch 58', and the steer feed line 127 is connected to the right steer line 188. Right steer line 188 is connected by the relay valve in the down position to the right low line 226 to engage the right low brake 59' to provide low ratio in the right unit 42 and high ratio in the left gear unit 44 for right geared steering. For left steering in high, downward movement of the left steer valve 173 similarly disengages the left high clutch 58 and engages the left low brake 59 to provide low ratio drive in the left gear unit with high ratio drive in the right unit for left geared steer.

For reverse drive the manual valve 201 is placed in the reverse position R, connecting main line 117 to the reverse line 204 which supplies fluid to the chamber 38 to engage the reverse clutch 27 so that there is drive from the reversely driven input gear 11 to drive the cross shaft 23 in reverse direction. The manual valve also connects the right and left drive feed lines 186, 187 to the right and left low feed lines 216 and 217. Since the signal line 218 is exhausted at the manual valve, the spring 224 turns the relay valve to the low or upper position connecting the right and left low feed lines 216 and 217 respectively to the right and left low lines 226 and 227 to engage low ratio in both gear units to provide a low ratio reverse drive.

For a turn toward the right in reverse drive, the right steering valve 172 is depressed exhausting the right drive feed line 186 which through the manual valve the right low feed line 216 and the right low line 226 exhaust and disengage the right low drive. The steering valve also supplies fluid at a regulated pressure, as pointed out above in the description of the steering valve, to the right steer line 188 which is connected at the relay valve to the right brake signal line 231. The right brake signal line 231 is connected at the shuttle valve 281 to the right branch 283 and the brake line 286 to apply the right brake 81' to retard the right output shaft for clutch brake steering to the right. In reverse drive, the left steering is similarly accomplished by depressing the left steer valve.

The shift inhibitor mechanism 346 at speeds above a safe speed for shifting from forward to reverse, or reverse to forward, biases plungers 347 and 348 to a position in which they will stop movement of cam 360 and the associated linkage for moving the manual valve 201. Thus if the manual valve is in neutral, as shown, or low or high, and the vehicle or output speed is over the safe value, plunger 348 will be moved outwardly against the spring bias so that cam 360 will engage the plunger and prevent movement beyond neutral toward reverse. Similarly, if the manual valve is in reverse drive, at excessive speeds, the plunger 347 will prevent movement to neutral, low and high positions.

When engines having little or no engine braking ability are employed with the transmission, there is a safety control to prevent motoring the engine at excessive speeds. In this control, an input driven governor 136 actuates the overspeed control valve 161 to provide main line pressure at excessive input or engine speeds to the overspeed brake line 166 which is connected to the center of the shuttle valve 281 to separate the shuttle valves 282, 283 to supply fluid to the right and left vehicle brake line 286, 287 to apply the right and left vericle brakes to limit the speed of the vehicle and engine to a safe value. Since the passage 272 is restricted as compared to the overspeed brake line 166, sufficient fluid will be supplied to the brake lines 286, 287 to apply the brakes even though line 166 is open via line 271, brake valve 256 and restricted passage 272 to exhaust 274.

Vehicle braking provided by actuation of brake pedal 241 actuates the mechanical brake apply cams 87 and 87' through the mechanical linkage to provide mechanically applied self-energizing brake operation and by actuating valve 256 to provide a hydraulic pressure to brake feed line 271 proportional to the brake pressure. This control provides a controlled hydromechanical arrangement for applying the vehicle brakes. The brake feed line 271, when supplied with brake apply pressure, will under normal conditions separate the shuttle valves to supply both brakes. However, during clutch brake steering, the operator may, by controlling the position of the steer valve which provides a regulated pressure for controlling one brake, also control the vehicle brake pedal 241 to apply a lesser brake pressure to the other brake. Thus he may control the steering and vehicle brake control to apply both brakes but to a different degree to brake the vehicle and steer.

The invention may be modified within the scope of the appended claims.

I claim:

1. In a transmission; a drive element; a driven element; drive means connecting said drive and driven elements having a plurality of forward drives and a reverse drive motor operable to provide a plurality of forward drives and reverse drive; a source of fluid under pressure, shift control valve means having a movable element operable in a plurality of forward positions and a reverse position to selectively connect said source to said motors to provide said plurality of forward drives and said reverse drive and having an abutment means movable with said movable element; governor means providing a governor force proportional to driven element speed; inhibitor means including a first and second stop member normally biased to a release position and biased by said governor force to an inhibiting position, said first stop member moving to inhibiting position when said abutment means is in a forward drive position to prevent movement of said abutment to reverse drive position and said second stop member moving to inhibiting position when said abutment means is in reverse position to prevent movement of said abutment means to forward position.

2. The invention defined in claim 1 and said governor means including a cylindrical housing having a drum therein driven by said driven element, a restricted passage connected to said housing at the outer perimeter of said drum, a radial passage in said drum and means connecting said radial passage adjacent the axis of rotation of said drum to exhaust to provide a governor pressure in said restricted passage between said restriction and said housing.

References Cited

UNITED STATES PATENTS

| 2,833,162 | 5/1958 | Forster | 74—752 X |
| 2,924,124 | 2/1960 | Froslie | 74—752 X |
| 3,096,666 | 7/1963 | Christenson et al. | 74—752 X |
| 3,313,183 | 4/1967 | Bailey et al. | 74—752 |

ARTHUR T. McKEON, *Primary Examiner.*

U.S. Cl. X.R.

339—184

UNITED STATES PATENT OFFICE
CERTIFICATE OF CORRECTION

Patent No. 3,433,098                                                          March 18, 1969

Robert H. Schaefer

It is certified that error appears in the above identified patent and that said Letters Patent are hereby corrected as shown below:

Column 1, line 63, "valves" should read -- valve --. Column 3, line 21, "cylinder 7" should read -- cylinder 87 --; line 33, "bear" should read -- gear --; line 67, "spring 123" should read -- spring 124 --. Column 5, line 22, "connetced" should read -- connected --; line 69, "connetced" should read -- connected --. Column 10, line 34, "vericle" should read -- vehicle --.

Signed and sealed this 31st day of March 1970.

(SEAL)
Attest:

Edward M. Fletcher, Jr.                                      WILLIAM E. SCHUYLER, JR.
Attesting Officer                                                       Commissioner of Patents